US 9,246,566 B2

(12) United States Patent
Guo et al.

(10) Patent No.: US 9,246,566 B2
(45) Date of Patent: *Jan. 26, 2016

(54) TRANSMISSION METHOD, APPARATUS, AND SYSTEM BASED ON UPLINK TRANSMIT DIVERSITY

(71) Applicant: Huawei Technologies Co., Ltd., Shenzhen, Guangdong (CN)

(72) Inventors: Xuanyu Guo, Shenzhen (CN); Yanyan Chen, Beijing (CN); Yongqiang Gao, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

This patent is subject to a terminal disclaimer.

(21) Appl. No.: 14/066,424

(22) Filed: Oct. 29, 2013

(65) Prior Publication Data

US 2014/0056376 A1 Feb. 27, 2014

Related U.S. Application Data

(63) Continuation of application No. PCT/CN2011/073569, filed on Apr. 29, 2011.

(51) Int. Cl.
*H04M 1/00* (2006.01)
*H04B 7/06* (2006.01)
(Continued)

(52) U.S. Cl.
CPC .............. *H04B 7/06* (2013.01); *H04B 7/0404* (2013.01); *H04W 52/367* (2013.01);
(Continued)

(58) Field of Classification Search
CPC ...... H04B 7/06; H04B 7/0408; H04W 52/367
USPC ......... 455/515, 517, 522, 524, 560, 561, 101, 455/103, 127.1
See application file for complete search history.

(56) References Cited

U.S. PATENT DOCUMENTS

2004/0001472 A1  1/2004  Kwak et al.
2006/0126509 A1* 6/2006  Abi-Nassif ............. H04L 47/10
                                                  370/235
(Continued)

FOREIGN PATENT DOCUMENTS

CN  1462124 A  12/2003
CN  1909407 A   2/2007
(Continued)

OTHER PUBLICATIONS

"Iub/Iur handling of deactivation/reactivation of secondary carrier for DC-HSUPA," 3GPP TSG-RAN3 Meeting #64, San Francisco, California, R3-091170, 3rd Generation Partnership Project, Valbonne, France (May 4-8, 2009).
(Continued)

*Primary Examiner* — Tuan Pham
(74) *Attorney, Agent, or Firm* — Leydig, Voit & Mayer, Ltd.

(57) ABSTRACT

A transmission method, apparatus, and system based on uplink transmit diversity, relating to the field of communications are provided. To timely and efficiently determine to activate or deactivate uplink transmit diversity and improve uplink transmission quality, a base station sends an activation request instruction to a radio network controller when determining, according to relevant reference measurement value(s) of a user equipment, to activate uplink transmit diversity of the user equipment; and the radio network controller notifies, according to the activation request instruction, the user equipment of activating the uplink transmit diversity; or a base station sends a deactivation request instruction to a radio network controller when determining, according to relevant reference measurement value(s) of a user equipment, to deactivate uplink transmit diversity of the user equipment; and the radio network controller notifies, according to the deactivation request instruction, the user equipment of deactivating the uplink transmit diversity.

25 Claims, 7 Drawing Sheets

(51) Int. Cl.
*H04B 7/04* (2006.01)
*H04W 52/14* (2009.01)
*H04W 52/36* (2009.01)

(52) U.S. Cl.
CPC ............ *H04B 7/0604* (2013.01); *H04B 7/0617* (2013.01); *H04B 7/0619* (2013.01); *H04W 52/146* (2013.01); *H04W 52/365* (2013.01)

(56) References Cited

U.S. PATENT DOCUMENTS

| | | |
|---|---|---|
| 2008/0123548 A1 | 5/2008 | Ranta-aho et al. |
| 2008/0175329 A1 | 7/2008 | Kuo |
| 2010/0056184 A1* | 3/2010 | Vakil ................. H04W 4/02 455/456.5 |
| 2010/0172425 A1 | 7/2010 | Pare et al. |
| 2010/0234060 A1 | 9/2010 | Beamish |
| 2011/0026631 A1 | 2/2011 | Zhang et al. |
| 2011/0085614 A1 | 4/2011 | De Pasquale et al. |
| 2012/0113797 A1* | 5/2012 | De Pasquale ........ H04B 7/0628 370/216 |
| 2012/0135762 A1 | 5/2012 | Cheng et al. |
| 2014/0056376 A1 | 2/2014 | Guo et al. |
| 2014/0080422 A1* | 3/2014 | Guo et al. .................. 455/67.11 |

FOREIGN PATENT DOCUMENTS

| | | |
|---|---|---|
| CN | 101132256 A | 2/2008 |
| CN | 101166143 A | 4/2008 |
| CN | 101212807 A | 7/2008 |
| CN | 101350694 A | 1/2009 |
| CN | 101959271 A | 1/2011 |
| CN | 101998673 A | 3/2011 |
| CN | 102035584 A | 4/2011 |
| CN | 102761357 A | 10/2012 |
| KR | 20060108854 A | 10/2006 |
| WO | WO 2011043727 A2 | 4/2011 |
| WO | WO 2011116727 A2 | 9/2011 |

OTHER PUBLICATIONS

"Dynamic control of UL CLTD via HS-SCCH orders." 3GPP TSG RAN WG1 Meeting #65, Barcelona, Spain, Change Request, R1-111533, $3^{rd}$ Generation Partnership Project, Valbonne, France (May 9-13, 2011).

"3GPP TS 25.331—$3^{rd}$ Generation Partnership Project; Technical Specification Group Radio Access Network; Radio Resource Control (RRC); Protocol specification (Release 11)," Version 11.0.0, $3^{rd}$ Generation Partnership Project, Valbonne, France (Dec. 2011).

"3GPP TS 25.433—$3^{rd}$ Generation Partnership Project; Technical Specification Group Radio Access Network; UTRAN lub interface Node B Application Part (NBAP) signaling (Release 9)," Version 9.6.0, $3^{rd}$ Generation Partnership Project, Valbonne, France (Mar. 2011).

"3GPP TS 25.433—$3^{rd}$ Generation Partnership Project; Technical specification Group Radio Access Network; UTRAN lub interface Node B Application Part (NBAP) signaling (Release 11)," Verison 11.0.0, $3^{rd}$ Generation Partnership Project, Valbonne, France (Dec. 2011).

"3GPP TR 25.863—$3^{rd}$ Generation Partnership Project; Technical Specification Group Radio Access Network; Universal Terrestrial Radio Access (UTRA); Uplink transmit diversity for High Speed Packet Access (HSPA) (Release 11)," Version 11.0.0, $3^{rd}$ Generation Partnership Project, Valbonne, France (Dec. 2011).

Notice of Allowance is corresponding U.S. Appl. No. 14/115,862, filed Sep. 9, 2015.

\* cited by examiner

TRANSMISSION METHOD, APPARATUS, AND SYSTEM BASED ON UPLINK TRANSMIT DIVERSITY

CROSS-REFERENCE TO RELATED APPLICATIONS

This application is a continuation of International Patent Application No. PCT/CN2011/073569, filed on Apr. 29, 2011, which is hereby incorporated by reference in its entirety.

TECHNICAL FIELD

The present invention relates to the field of communications technologies, and in particular to a transmission method, apparatus, and system based on uplink transmit diversity.

BACKGROUND

An uplink transmit diversity technology is capable of reducing a transmit power of a terminal, improving edge coverage, and improving cell capacity, and at the same time has the function of improving a service transmission rate for a cell edge user, thereby improving user experience. Therefore, the uplink transmit diversity technology such as MIMO (Multiple-Input Multiple-Output, multiple-input multiple-output) used in uplink transmission of a UMTS (Universal Mobile Telecommunications System, Universal Mobile Telecommunications System) may meet requirements of improving spectral efficiency, improving uplink transmission coverage, and further improving a user peak rate in the uplink transmission of the UMTS.

In the prior art, in a scenario where the uplink transmit diversity technology is used in the uplink transmission of the UMTS, according to an uplink transmit diversity capability of a UE (User Equipment, user equipment) carried in an RRC (Radio Resource Control, radio resource control) connection setup request that is sent from the UE and an uplink transmit diversity capability of a cell in an AUDIT message that is sent from a NodeB (base station), an RNC (Radio Network Controller, radio network controller) may determine, during service establishment as shown in FIG. 1, that the UE and the NodeB are capable of transmitting data by adopting uplink transmit diversity and determine whether to activate uplink transmit diversity of the UE. In addition, when the RNC determines to activate the uplink transmit diversity of the UE, the RNC notifies, through an RL Setup Request (radio link setup request) and an RB Setup Request (radio bearer setup request) respectively, the NodeB and the UE of activating the uplink transmit diversity of the UE.

Whether to activate the uplink transmit diversity of the UE is only determined during service establishment. Therefore, activation/deactivation of the uplink transmit diversity of the UE cannot be dynamically adjusted according to relevant reference measurement value(s) such as a current power and channel quality of the UE after service establishment. In view of this, it is further put forward in the prior art that the RNC dynamically adjusts activation/deactivation of the uplink transmit diversity of the UE through an RB reconfiguration process and an RL reconfiguration process after service establishment. The specific process is shown in FIG. 2.

During implementation of the present invention, the inventor finds that at least the following problems exist in the prior art: After receiving relevant reference measurement value(s) reported by the UE or the NodeB, the RNC judges, according to the reported relevant reference measurement value, whether to activate the uplink transmit diversity of the UE; however, timeliness of reporting by the UE or the NodeB is determined by a measurement report period, and the problem of a relatively high delay exists; as a result, timeliness and validity of determining whether to active the uplink transmit diversity are relatively poor, thereby affecting uplink transmission.

SUMMARY

Embodiments of the present invention provide a transmission method, apparatus, and system based on uplink transmit diversity, which are capable of timely and efficiently determining to activate or deactivate the uplink transmit diversity, thereby improving uplink transmission quality.

According to one aspect, the present invention provides a transmission method based on uplink transmit diversity, including: sending, by a base station, an activation request instruction to a radio network controller when determining, according to relevant reference measurement value(s) of a user equipment, to activate uplink transmit diversity of the user equipment; and notifying, by the radio network controller, according to the activation request instruction, the user equipment of activating the uplink transmit diversity; or sending, by a base station, a deactivation request instruction to a radio network controller when determining, according to relevant reference measurement value(s) of a user equipment, to deactivate uplink transmit diversity of the user equipment; and notifying, by the radio network controller, according to the deactivation request instruction, the user equipment of deactivating the uplink transmit diversity.

According to another aspect, the present invention provides a base station, including: an activation judgment unit, configured to determine, according to relevant reference measurement value(s) of a user equipment, to activate or deactivate uplink transmit diversity of the user equipment; and an instruction sending unit, configured to send an activation request instruction to a radio network controller when the activation judgment unit determines to activate the uplink transmit diversity of the user equipment, so that the radio network controller notifies, according to the activation request instruction, the user equipment of activating the uplink transmit diversity; or send a deactivation request instruction to a radio network controller when the activation judgment unit determines to deactivate the uplink transmit diversity of the user equipment, so that the radio network controller notifies, according to the deactivation request instruction, the user equipment of deactivating the uplink transmit diversity.

According to another aspect, the present invention provides a transmission method based on uplink transmit diversity, including: receiving an activation request instruction, which is sent from a base station when determining according to relevant reference measurement value(s) of a user equipment, to activate uplink transmit diversity of the user equipment; and notifying, according to the activation request instruction, the user equipment of activating the uplink transmit diversity; or receiving a deactivation request instruction, which is sent from a base station when determining, according to relevant reference measurement value(s) of a user equipment, to deactivate uplink transmit diversity of the user equipment; and notifying, according to the deactivation request instruction, the user equipment of deactivating the uplink transmit diversity.

According to another aspect, the present invention provides a radio network controller, including: an instruction receiving unit, configured to receive an activation request instruction of activating uplink transmit diversity of a user equipment, which is sent from a base station when determining, according to relevant reference measurement value(s) of the user equipment, to activate uplink transmit diversity of the user equipment, or receive a deactivation request instruction of deactivating uplink transmit diversity of a user equipment, which is sent from a base station when determining, according to relevant reference measurement value(s) of the user equipment, to deactivate uplink transmit diversity of the user equipment; and a notification sending unit, configured to send, according to the activation request instruction, a notification of activating the uplink transmit diversity to the user equipment, or send, according to the deactivation request instruction, a notification of deactivating the uplink transmit diversity to the user equipment.

According to another aspect, the present invention provides a transmission method based on uplink transmit diversity, including: sending, by a user equipment, a notification of activating uplink transmit diversity of the user equipment to a base station when determining, according to relevant reference measurement value(s) of the user equipment, to activate the uplink transmit diversity; or sending, by a user equipment, a notification of deactivating uplink transmit diversity of the user equipment to a base station when determining, according to relevant reference measurement value(s) of the user equipment, to deactivate the uplink transmit diversity.

According to another aspect, the present invention provides a user equipment, including: an activation judgment unit, configured to determine, according to relevant reference measurement value(s) of the user equipment, to activate or deactivate uplink transmit diversity; an activation processing unit, configured to activate the uplink transmit diversity when the activation judgment unit determines to activate the uplink transmit diversity, and deactivate the uplink transmit diversity when the activation judgment unit determines to deactivate the uplink transmit diversity of the user equipment; and a notification sending unit, configured to send a notification of activating the uplink transmit diversity of the user equipment to a base station when the activation judgment unit determines to activate the uplink transmit diversity, or send a notification of deactivating the uplink transmit diversity of the user equipment to a base station when the activation judgment unit determines to deactivate the uplink transmit diversity.

According to another aspect, the present invention provides a transmission method based on uplink transmit diversity, including: receiving, by a base station, a notification of activating uplink transmit diversity of a user equipment, which is sent from the user equipment when determining, according to relevant reference measurement value(s) of the user equipment, to activate the uplink transmit diversity; or receiving, by a base station, a notification of deactivating uplink transmit diversity of a user equipment, which is sent from the user equipment when determining, according to relevant reference measurement value(s) of the user equipment, to deactivate the uplink transmit diversity.

According to another aspect, the present invention provides a base station, including: a notification receiving unit, configured to receive a notification of activating uplink transmit diversity of a user equipment, which is sent from the user equipment when determining, according to relevant reference measurement value(s) of the user equipment, to activate the uplink transmit diversity; or receive a notification of deactivating uplink transmit diversity of a user equipment, which is sent from the user equipment when determining, according to relevant reference measurement value(s) of the user equipment, to deactivate the uplink transmit diversity.

According to another aspect, the present invention provides a transmission system based on uplink transmit diversity, including a base station and a radio network controller.

The base station is configured to send an activation request instruction to the radio network controller when determining, according to relevant reference measurement value(s) of a user equipment, to activate uplink transmit diversity of the user equipment; or send a deactivation request instruction to the radio network controller when determining, according to relevant reference measurement value(s) of a user equipment, to deactivate uplink transmit diversity of the user equipment.

The radio network controller is configured to receive the activation request instruction sent from the base station, and notify, according to the activation request instruction, the user equipment of activating the uplink transmit diversity; or receive the deactivation request instruction sent from the base station, and notify, according to the deactivation request instruction, the user equipment of deactivating the uplink transmit diversity.

The transmission method, apparatus, and system based on uplink transmit diversity provided by the embodiments of the present invention are capable of timely and efficiently adjusting an uplink transmission manner that is suitable for a current transmission condition, thereby improving uplink transmission quality.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings according to these accompanying drawings without creative efforts.

DESCRIPTION OF EMBODIMENTS

Figure 1:
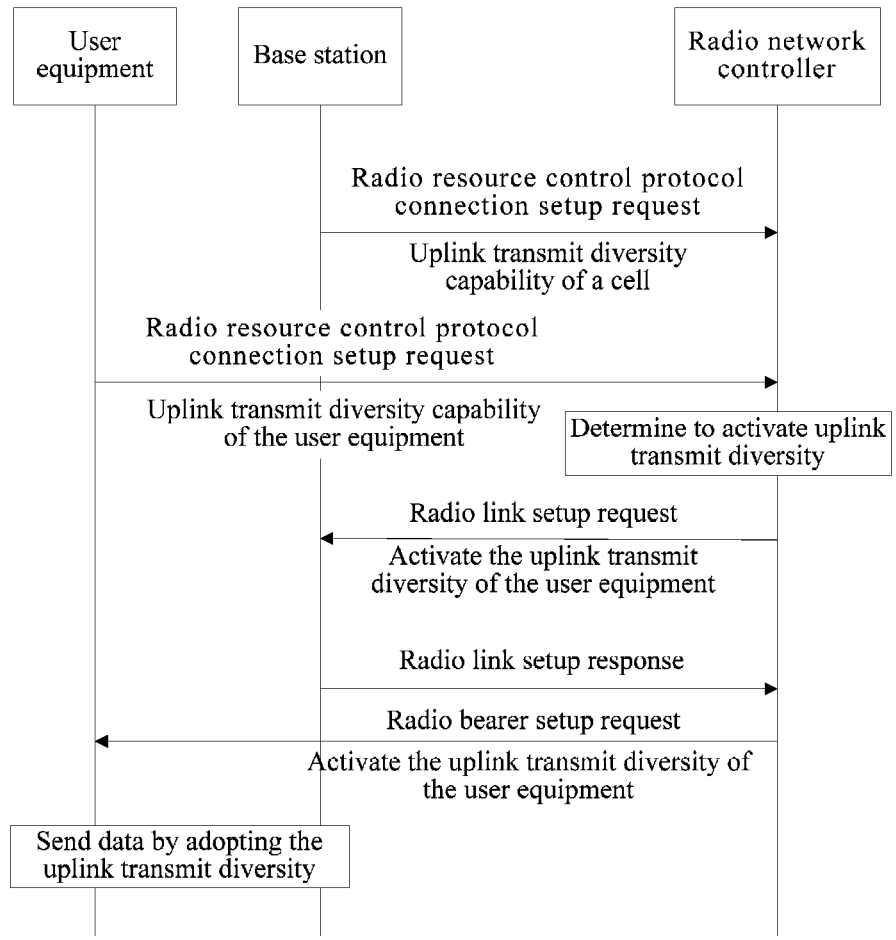
FIG. 1 is a schematic flowchart of a method for dynamically adjusting activation/deactivation based on uplink transmit diversity of a UE according to the prior art.
Figure 2:
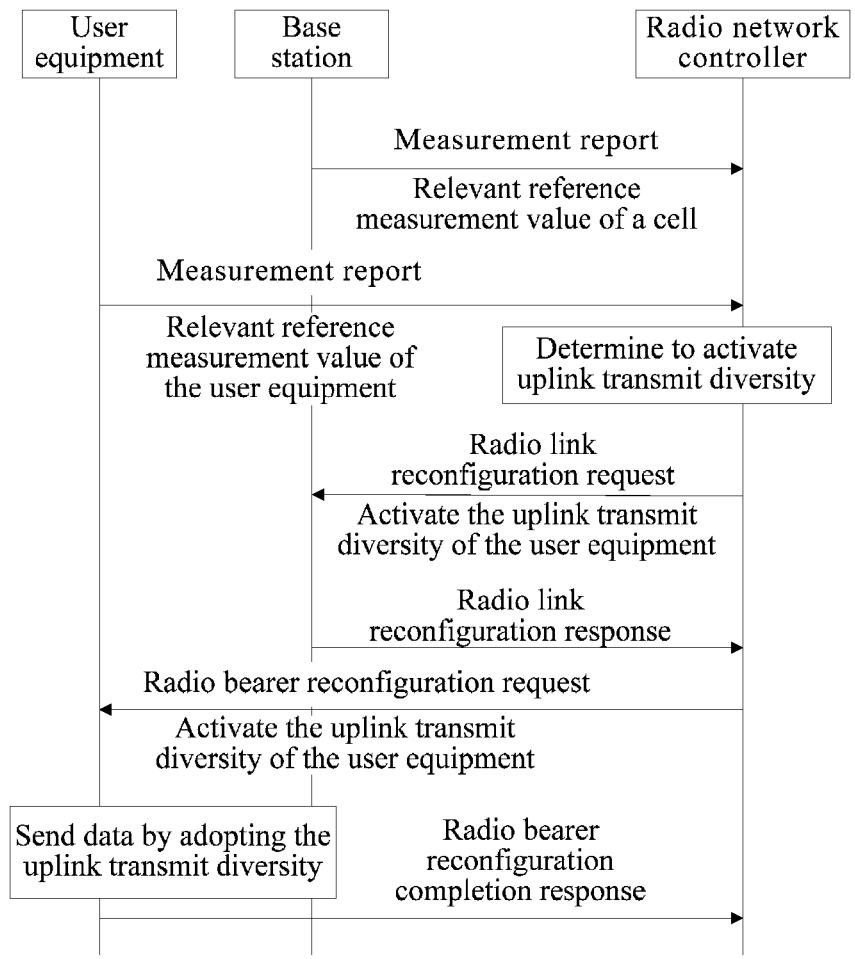
FIG. 2 is a schematic flowchart of another method for dynamically adjusting activation/deactivation based on uplink transmit diversity of a UE according to the prior art.

The following clearly describes the technical solutions in the embodiments of the present invention with reference to the accompanying drawings in the embodiments of the present invention. Apparently, the described embodiments are merely a part of embodiments of the present invention rather than all of the embodiments. All other embodiments obtained by persons of ordinary skill in the art based on the embodiments of the present invention without creative efforts shall fall within the protection scope of the present invention.

Various technologies described in this document are applicable to various wireless communications systems, for example, current 2G and 3G communications systems and a next-generation communications system, for example, a Global System for Mobile communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access Wireless (WCDMA, Wideband Code Division Multiple Access Wireless) system, a Frequency Division Multiple Addressing (FDMA, Frequency Division Multiple Addressing) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and another communications system of this type.

This document describes various aspects with reference to a terminal and/or a base station and/or a base station controller.

The terminal may be a wireless terminal or a wired terminal. The wireless terminal may be a user-oriented device providing voice and/or data connectivity, a handheld device having a wireless connection function, or another processing device connected to a wireless modem. The wireless terminal may communicate with one or more core networks over a radio access network (for example, RAN, Radio Access Network). The wireless terminal may be a mobile terminal, for example, a mobile phone (or called a "cellular" phone) and a computer equipped with a mobile terminal. For example, may be a portable, pocket, handheld, computer-embedded, or vehicle-mounted mobile apparatus, which exchange language and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, and a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (for example, an access point) may be a device that communicates with the wireless terminal through one or multiple sectors on an air interface in an access network. The base station may be configured to perform conversion between a received air frame and an IP packet, acting as a router between the wireless terminal and the rest part of the access network, where the rest part of the access network may include an Internet Protocol (IP) network. The base station may also coordinate attribute management on the air interface. For example, the base station may be a base station (BTS, Base Transceiver Station) in the GSM or the CDMA, may also be a base station (NodeB) in the WCDMA, and may further be an evolved base station (NodeB, or eNB, or e-NodeB, evolutional Node B) in the LTE, which is not limited in the present invention.

The base station controller may be a base station controller (BSC, base station controller) in the GSM or CDMA, or a radio network controller (RNC, Radio Network Controller) in the WCDMA, which is not limited in the present invention.

In addition, the terms "system" and "network" in this document can always be exchanged for use in this document. The term "and/or" in this document is only an association relationship for describing the associated objects, and represents that three relationships may exist, for example, A and/or B may represent the following three cases: A exists separately, both A and B exist, and B exists separately. In addition, the character "/" in this document generally represents that the former and later associated objects are in a "or" relationship.

An embodiment of the present invention provides a transmission method based on uplink transmit diversity to timely and efficiently determine whether to activate or deactivate the uplink transmit diversity and improve uplink transmission quality.

When determining, according to relevant reference measurement value(s) of a user equipment, to activate uplink transmit diversity of the user equipment, a base station sends an activation request instruction to a radio network controller; and the radio network controller notifies, according to the activation request instruction, the user equipment of activating the uplink transmit diversity.

Optionally, when determining, according to relevant reference measurement value(s) of a user equipment, to deactivate uplink transmit diversity of the user equipment, a base station sends a deactivation request instruction to a radio network controller; and the radio network controller notifies, according to the deactivation request instruction, the user equipment of deactivating the uplink transmit diversity.

Figure 3:
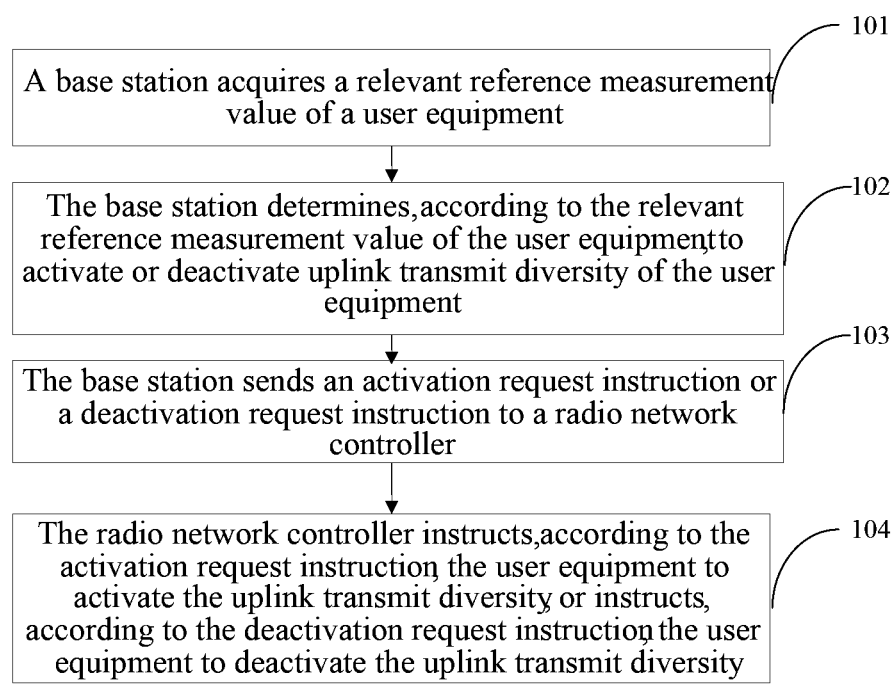
FIG. 3 is a schematic flowchart of a transmission method based on uplink transmit diversity according to an embodiment of the present invention.

As shown in FIG. 3, in this embodiment, activation/deactivation based on uplink transmit diversity of a user equipment can be implemented specifically according to the following steps.

101. A base station acquires relevant reference measurement value(s) of a user equipment.

In the embodiment of the present invention, the relevant reference measurement value(s) of the user equipment includes information such as a power of the user equipment and a CQI (Channel Quality Indication, channel quality instruction).

For example, a NodeB may receive a measurement report of the UE periodically reported by the UE and acquire the relevant reference measurement value(s) of the UE from the measurement report.

102. The base station determines, according to the relevant reference measurement value(s) of the user equipment, to activate or deactivate uplink transmit diversity of the user equipment.

In the embodiment of the present invention, the uplink transmit diversity may adopt various diversity manners, such as, TSTD (Time Switched Transmission Diversity, time switched transmission diversity), OLTD (Open Loop Transmission Diversity, open loop transmission diversity), CLTD (Closed Loop Transmission Diversity, closed loop transmission diversity), and MIMO (Multi-Input Multi-Output, multi-input multi-output).

In addition, transmission manners of the uplink transmit diversity may be further classified into two kinds: antenna switching (Ant Switching) and beamforming (Beamforming). The antenna switching transmission principle is that the UE alternately measures transmit powers of two transmit antennas and selects, according to a TPC (Transmission Power Control, transmission power control) command word, the antenna with a smaller power to send data. The beamforming transmission principle is that the UE traverses multiple beamforming factors, speculates the beamforming factor with the largest signal-to-noise ratio according to a power control command word, weights data through the factor, and then sends the data.

For example, the NodeB may determine, according to a preset activation condition and the relevant reference measurement value(s) of the UE, to activate or deactivate the uplink transmit diversity of the UE. Optionally, the NodeB may also detect relevant reference measurement value(s) of the NodeB itself, and determine, according to a preset activation condition and the relevant reference measurement value(s) of the UE and the relevant reference measurement value(s) of the NodeB, to activate or deactivate the uplink transmit diversity of the UE. The relevant reference measurement value(s) of the NodeB includes information such as a resource use condition in the NodeB and performance of a receiver. The activating the uplink transmit diversity of the UE may be configuring and starting the uplink transmit diversity of the UE, and the deactivating the uplink transmit diversity of the UE may be disarming and stopping the uplink transmit diversity of the UE.

103. The base station sends an activation request instruction to a radio network controller when determining to activate the uplink transmit diversity of the user equipment, or sends a deactivation request instruction to a radio network controller when determining to deactivate the uplink transmit diversity of the user equipment.

For example, the NodeB may send an activation request instruction/a deactivation request instruction of the uplink transmit diversity of the UE to the RNC according to a determined result in step 102, that is, the NodeB sends an activation request instruction of activating the uplink transmit diversity of the UE to the RNC when determining to activate the uplink transmit diversity of the UE, and the NodeB sends a deactivation request instruction of deactivating the uplink transmit diversity of the UE when determining to deactivate the uplink transmit diversity of the UE.

104. The radio network controller notifies, according to the activation request instruction, the user equipment of activating the uplink transmit diversity, or notifies, according to the deactivation request instruction, the user equipment of deactivating the uplink transmit diversity.

For example, the RNC may notify, according to the activation request instruction/deactivation request instruction, the UE of activating/deactivating the uplink transmit diversity. Optionally, the RNC may further send a corresponding acknowledgment response to the NodeB when notifying the UE of activating/deactivating the uplink transmit diversity. Optionally, the RNC may also send a corresponding activation/deactivation completion notification to the base station when learning that the UE completes the activation/deactivation of the uplink transmit diversity. For example, the RNC may notify, through an L3 signaling message, the UE of performing activation or deactivation processing on the uplink transmit diversity. The L3 signaling message may be an RRC message of an air interface, for example, may be a Radio Bearer Reconfiguration message. Optionally, a corresponding activation/deactivation completion notification may also be directly sent to the base station through a physical channel when the UE completes the activation/deactivation of the uplink transmit diversity.

In addition, before determining to activate/deactivate the uplink transmit diversity of the UE is performed, the UE and the NodeB may respectively send uplink transmit diversity capabilities to the RNC, so that the RNC learns that the UE and the NodeB have the capability of sending data by adopting the uplink transmit diversity. The RNC may send configuration parameter information to the UE and the NodeB after learning that the UE and the NodeB have the capability of sending data by adopting the uplink transmit diversity. The UE and the NodeB perform, according to the configuration parameter information, some configuration operations related to the uplink transmit diversity.

According to the transmission method based on uplink transmit diversity provided in this embodiment, a base station determines, according to relevant reference measurement value(s) of a user equipment, to activate/deactivate uplink transmit diversity of the user equipment, and instructs a radio network controller to notify the user equipment of activating/deactivating the uplink transmit diversity. In addition, the base station is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

In the preceding embodiment, after receiving the activation request instruction/deactivation request instruction that is sent from the base station according to the determined result, the radio network controller may send an acknowledgment response to the base station while notifying the user equipment of activating/deactivating the uplink transmit diversity, and may also send a completion notification to the base station when learning that the user equipment completes activation/deactivation of the uplink transmit diversity. The following takes uplink transmit diversity adopting an OLTD diversity manner as an example to further describe the preceding embodiment in detail with reference to the different conditions.

Figure 4:
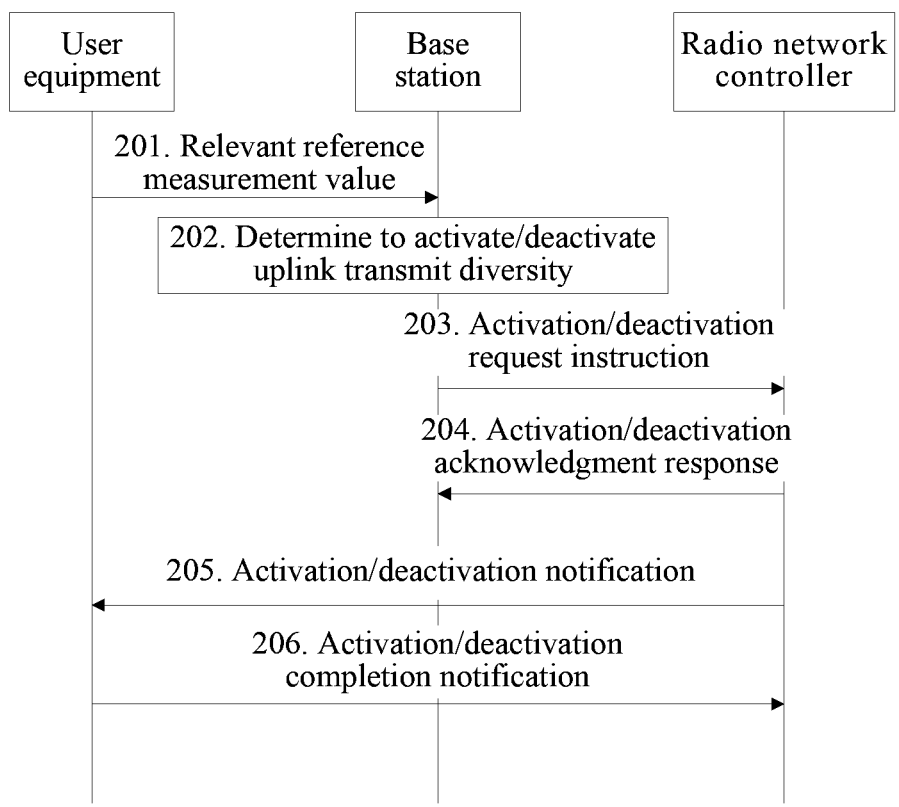
FIG. 4 is a schematic flowchart of another transmission method based on uplink transmit diversity according to an embodiment of the present invention.

As shown in FIG. 4, a transmission method based on uplink transmit diversity in this embodiment includes:

201. A UE reports relevant reference measurement value(s) of the UE to a NodeB through a physical channel.

202. The NodeB judges, according to the relevant reference measurement value(s) reported by the UE and a detected relevant reference measurement value(s) of the base station itself, whether to activate/deactivate uplink OLTD.

For example, the NodeB may determines, according to a power and CQI that are reported by the UE, a resource use condition (or a relevant measurement value) in the NodeB, and a preset activation/deactivation condition, to activate/deactivate the uplink OLTD of the UE. The activation condition or deactivation condition may be flexibly set according to a transmission requirement of uplink data.

For example, assume that the NodeB determines that the UE is currently in asynchronous state according to a received frame sent from the UE. In this situation, inaccurate TPC may result in unreliability of performance of the uplink transmit diversity. Therefore, if the uplink OLTD of the UE is currently activated, the NodeB may determine to deactivate the uplink OLTD of the UE.

Optionally, assume that the NodeB determines that the UE is always in power-limited state according to a UPH (UE Power Headroom, UE power headroom) reported by the UE. In this situation, a power of a DPCCH (Dedicated Physical Control Channel, dedicated physical control channel) is also compressed. A TPC command word fed back by the NodeB cannot reflect a real condition of the channel. This is because that the TPC command word is always a value for improving a power in this situation. This brings deterioration of the performance of the uplink transmit diversity. Therefore, if the uplink OLTD of the UE is currently activated, the NodeB may determine to deactivate the uplink OLTD of the UE.

Optionally, assume that the NodeB determines that the UE is moving at a high speed according to an action of the UE, for example, the UE frequently performs handover operations in a short period. In this situation, adopting the uplink transmit diversity may bring a negative gain. Therefore, if the uplink OLTD of the UE is currently activated, the NodeB may determine to deactivate the uplink OLTD of the UE.

Optionally, assume that the NodeB determines, according to the detected relevant reference measurement value(s) of the base station itself, that performance of a receiver deteriorates, the performance of the uplink transmit diversity may be affected. Therefore, if the uplink OLTD of the UE is currently activated, the NodeB may determine to deactivate the uplink OLTD of the UE.

Optionally, assume that the NodeB determines, according to a CQI reported by the UE, that the value of the CQI is lower than a certain configured threshold in a consecutive period of time. Therefore, it may be determined that quality of a channel between the NodeB and the UE is relatively poor, which may affect the performance of the uplink transmit diversity. Therefore, if the uplink OLTD of the UE is currently activated, the NodeB may determine to deactivate the uplink OLTD of the UE.

Assume that it is preset that the NodeB determines to deactivate the uplink OLTD of the UE only when the relevant reference measurement value(s) of the UE and the relevant reference measurement value(s) of the NodeB meet the preceding condition. In this case, the NodeB may determine to activate the uplink OLTD of the UE when both the relevant reference measurement value(s) of the UE and the relevant reference measurement value(s) of the NodeB fail to meet the preceding condition.

203. The NodeB sends an activation/deactivation request instruction to the RNC after the NodeB determines to activate/deactivate the uplink OLTD.

For example, the NodeB may send the activation/deactivation request instruction to the RNC through an Iub interface. For example, the NodeB may send the activation/deactivation request instruction to the RNC through an Iub FP. In addition, the NodeB may send the activation/deactivation request instruction through existing signaling. For example, a certain number of bits are added in a DEDICATED MEASUREMENT REPORT (dedicated measurement report) that is sent to the RNC. These bits are used to give an instruction of activating/deactivating the uplink OLTD of the UE. For example, when determining to activate/deactivate uplink OLTD of a certain UE, the NodeB adds the identifier of the UE and one bit in the DEDICATED MEASUREMENT REPORT that is sent to the RNC. The bit is used as an instruction bit. When the instruction bit is 0, it gives an instruction of deactivating the uplink OLTD of the UE, and when the instruction bit is 1, it gives an instruction of activating the uplink OLTD of the UE. Optionally, the NodeB may also send the activation request instruction/deactivation request instruction through newly added signaling.

In addition, the NodeB may further send a reason for activating/deactivating the uplink OLTD of the UE to the RNC while sending the activation/deactivation request instruction to the RNC. For example, assume that the NodeB sends the activation/deactivation request instruction through a DEDICATED MEASUREMENT REPORT. In this situation, a certain number of bits can be added in the DEDICATED MEASUREMENT REPORT. In addition, it may be preset that different values of these bits indicate different activation/deactivation reasons. For example, because a certain UE is in power-limited state, the NodeB determines to deactivate uplink OLTD of the UE, and the NodeB may add the identifier of the UE, an instruction bit, and a reason indication bit in the DEDICATED MEASUREMENT REPORT, set the instruction bit as 0 to give an instruction of deactivating the uplink OLTD of the UE, and set the reason indication bit as 010 to indicate that the deactivation reason is that the UE is in power-limited state.

204. The RNC returns an acknowledgment response to the NodeB after receiving the activation/deactivation request instruction sent from the NodeB.

For example, after receiving the activation/deactivation request instruction sent from the NodeB, the RNC sends an acknowledgment response to activation/deactivation of the uplink OLTD of the UE to the NodeB. The NodeB performs a corresponding adjustment according to the acknowledgment response to ensure synchronization between the NodeB and the UE. For an adjustment processing method of the NodeB, reference may be made to the prior art. Details are not repeated herein.

205. The RNC sends a notification of activating/deactivating the uplink OLTD to the UE according to the activation/deactivation request instruction while returning the acknowledgment response to the NodeB.

For example, while returning the acknowledgment response to the NodeB, the RNC may notify, through an RB reconfiguration request, the UE of activating/deactivating the uplink OLTD.

206. The RNC receives a notification of completing the activation/deactivation of the uplink OLTD, which is sent from the UE.

For example, the UE learns, through the RB reconfiguration request, that the uplink OLTD of the UE needs to be activated/deactivated. After completing the activation/deactivation of the uplink OLTD, the UE may send, through an RB reconfiguration response, a notification of completing the activation/deactivation of the uplink OLTD to the RNC, that is, the RNC is notified that the UE has completed the operation of activating/deactivating the uplink OLTD. After completing the activation of the uplink OLTD, the UE adopts the uplink OLTD to send uplink data.

According to the transmission method based on uplink transmit diversity provided in this embodiment, a base station determines, according to relevant reference measurement value(s) of a user equipment, to activate/deactivate uplink transmit diversity of the user equipment, and instructs a radio network controller to notify the user equipment of activating/deactivating the uplink transmit diversity. In addition, the base station is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Figure 5:
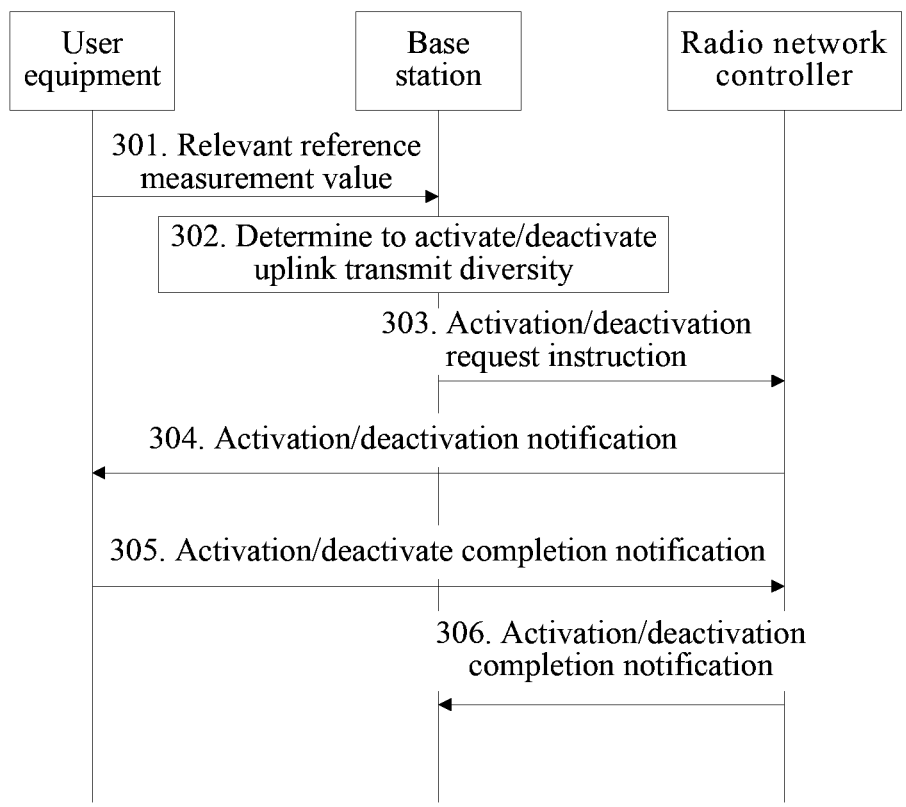
FIG. 5 is a schematic flowchart of another transmission method based on uplink transmit diversity according to an embodiment of the present invention.

As shown in FIG. 5, a transmission method based on uplink transmit diversity in this embodiment includes:

301. A UE reports relevant reference measurement value(s) of the UE to a NodeB through a physical channel.

302. The NodeB judges, according to the relevant reference measurement value(s) reported by the UE and a detected relevant reference measurement value(s) of the base station itself, whether to activate/deactivate uplink OLTD.

For specific operations in this step, reference may be made to step 202. Details are not repeated herein.

303. After the NodeB determines to activate/deactivate the uplink OLTD, the NodeB sends an activation/deactivation request instruction to an RNC.

For specific operations in this step, reference may be made to step 203. Details are not repeated herein.

304. The RNC sends a notification of activating/deactivating the uplink OLTD to the UE according to the activation/deactivation request instruction.

For specific operations in this step, reference may be made to step 205. Details are not repeated herein.

305. The RNC receives a notification of completing the activation/deactivation of the uplink OLTD, which is sent from the UE.

For specific operations in this step, reference may be made to step 206. Details are not repeated herein.

306. After receiving the notification of completing the activation/deactivation of the uplink OLTD, which is sent from the UE, the RNC sends an activation/deactivation completion notification to the NodeB.

According to the transmission method based on uplink transmit diversity provided in this embodiment, a base station determines, according to relevant reference measurement value(s) of a user equipment, to activate/deactivate uplink transmit diversity of the user equipment, and instructs a radio network controller to notify the user equipment of activating/deactivating the uplink transmit diversity. In addition, the base station is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Corresponding to the embodiment described in the above, an embodiment of the present invention further provides a transmission method based on uplink transmit diversity, including: A radio network controller receives an activation request instruction, which is sent from a base station when determining, according to relevant reference measurement value(s) of a user equipment, to activate uplink transmit diversity of the user equipment, and notifies, according to the activation request instruction, the user equipment of activating the uplink transmit diversity; or a radio network controller receives a deactivation request instruction, which is sent from a base station when determining, according to relevant reference measurement value(s) of a user equipment, to deactivate uplink transmit diversity of the user equipment, and notifies, according to the deactivation request instruction, the user equipment of deactivating the uplink transmit diversity.

According to the transmission method based on uplink transmit diversity provided in this embodiment, a base station determines, according to relevant reference measurement value(s) of a user equipment, to activate/deactivate uplink transmit diversity of the user equipment, and instructs a radio network controller to notify the user equipment of activating/deactivating the uplink transmit diversity. In addition, the base station is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

In addition, an embodiment of the present invention further provides a transmission method based on uplink transmit diversity, including:

A user equipment sends a notification of activating uplink transmit diversity of the user equipment to a base station when determining, according to relevant reference measurement value(s) of the user equipment, to activate the uplink transmit diversity; or a user equipment sends a notification of deactivating uplink transmit diversity of the user equipment to a base station when determining, according to relevant reference measurement value(s) of the user equipment, to deactivate the uplink transmit diversity.

Figure 6:
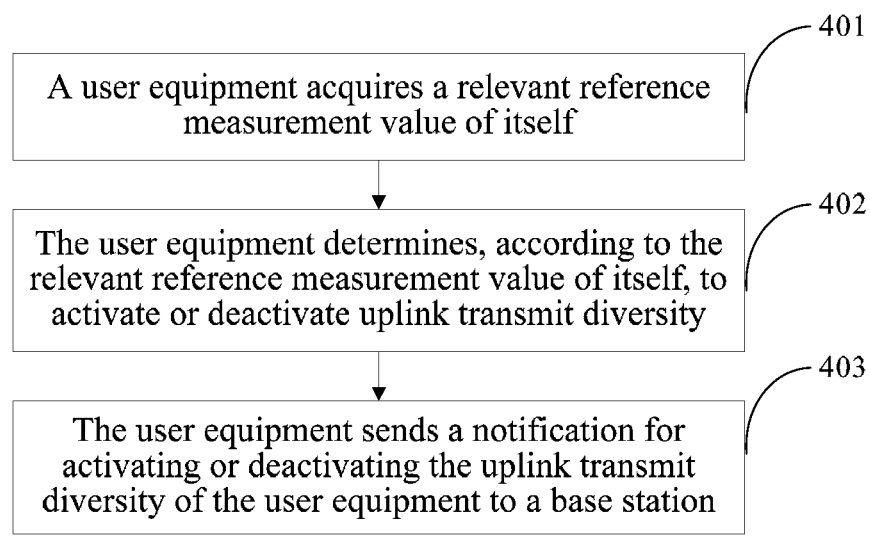
FIG. 6 is a schematic flowchart of another transmission method based on uplink transmit diversity according to an embodiment of the present invention.

As shown in FIG. 6, in this embodiment, activation/deactivation based on uplink transmit diversity of a user equipment can be implemented specifically according to the following steps.

401. A user equipment acquires relevant reference measurement value(s) of the user equipment.

For example, the UE may detect the relevant reference measurement value(s) of itself.

402. The user equipment determines, according to the relevant reference measurement value(s) of the user equipment, to activate or deactivate uplink transmit diversity of the user equipment.

For example, the UE may determine, according to a detected relevant reference measurement value(s) such as a power and channel quality of the UE itself and a preset activation/deactivation condition, to activate/deactivate uplink OLTD of the UE. Optionally, the UE may also receive relevant reference measurement value(s) of a NodeB, and determine, according to a detected power and channel quality of the UE itself, the received relevant reference measurement value(s) of the NodeB, and a preset activation/deactivation condition, to activate/deactivate uplink OLTD of the UE. The activation condition or deactivation condition may be flexibly set according to a transmission requirement of uplink data.

For example, assume that the UE is in CELL_DCH (CELL Dedicated Channel, cell dedicated channel) state. In this situation, the UE is assigned with dedicated physical channels on the uplink and downlink A UTRAN (Terrestrial Radio Access Network—UMTS, terrestrial radio access network) may learn a cell-level position of the UE according to a current active set of the UE. The UE may use a dedicated transmission channel, a HS-DSCH (High Speed Downlink Shared Channel, high speed downlink shared channel), and a combination of these transmission channels. In this state, if the uplink OLTD of the UE is currently deactivated, the UE may determine to activate the uplink OLTD. In addition, when the UE is in CELL FACH (CELL Forward Access Channel, cell forward access channel) state, the UE may also activate the uplink OLTD.

Assume that the NodeB has activated CPC (Continuous Packet Connectivity, continuous packet connectivity). The CPC adopts a manner of reserving a minimum bandwidth, which may avoid a reestablishment delay caused by a complete release of a dedicated channel when a user performs no service activity, and reduce control channel overhead, thereby increasing the number of users. In this state, if the uplink OLTD of the UE is currently deactivated, the UE may determine to activate the uplink OLTD.

Optionally, assume that the UE receives an RLC ACK (Radio Link Control ACKnowledge Character, radio link control acknowledge character) in response to a reconfiguration response message. The UE determines, according to the RLC ACK, that the uplink of the NodeB has been synchronized. In this case, when the UE is in CELL_DCH state and the NodeB has activated the CPC, if the uplink OLTD of the UE is currently deactivated, the UE may determine to activate the uplink OLTD.

Optionally, assume that the UE detects that itself is currently not in high-speed moving state. In this case, when the UE is in CELL_DCH state and the NodeB has activated the CPC, if the uplink OLTD of the UE is currently deactivated, the UE may determine to activate the uplink OLTD.

Optionally, assume that a power of the UE is currently not limited. In this situation, power compression is not performed on both a DPCCH and an E-DPCCH. Therefore, performance of the uplink transmit diversity is not affected. In this case, when the UE is in CELL_DCH state and the NodeB has activated the CPC, if the uplink OLTD of the UE is currently deactivated, the UE may determine to activate the uplink OLTD.

Optionally, assume that the UE determines that channel quality of a serving cell exceeds a certain configured threshold in a consecutive period of time, and therefore determines that the current channel quality of the serving cell is good. The consecutive period of time (time interval) and the threshold (threshold) may be configured by the RNC and may also be set by the UE itself. When the UE is in CELL_DCH state and the NodeB has activated the CPC, if the uplink OLTD of the UE is currently deactivated, the UE may determine to activate the uplink OLTD.

403. The user equipment sends a notification of activating the uplink transmit diversity of the user equipment to the base station when determining to activate the uplink transmit diversity, or sends a notification of deactivating the uplink transmit diversity of the user equipment to the base station when determining to deactivate the uplink transmit diversity.

For example, the UE sends a notification of activating the uplink transmit diversity of the UE to the NodeB when determining to activate the uplink transmit diversity of the UE. The NodeB performs a corresponding adjustment according to the notification and receives data subsequently sent from the UE by adopting the uplink transmit diversity manner. Optionally, the UE sends a notification of deactivating the uplink transmit diversity of the UE to the NodeB when determining to deactivate the uplink transmit diversity of the UE. The NodeB performs a corresponding adjustment according to the notification and receives data subsequently sent from the UE by adopting a non-uplink-transmit-diversity manner.

According to the transmission method based on uplink transmit diversity provided in this embodiment, a user equipment activates/deactivates uplink transmit diversity of the user equipment according to relevant reference measurement value(s) of the user equipment. In addition, the user equipment is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Corresponding to the preceding embodiment, an embodiment of the present invention further provides a transmission method based on uplink transmit diversity, including the following: A base station receives a notification of activating uplink transmit diversity of a user equipment, which is sent from the user equipment when determining, according to relevant reference measurement value(s) of the user equipment, to activate the uplink transmit diversity; or a base station receives a notification of deactivating uplink transmit diversity of a user equipment, which is sent from the user equipment when determining, according to relevant reference measurement value(s) of the user equipment, to deactivate the uplink transmit diversity.

According to the transmission method based on uplink transmit diversity provided in this embodiment, a user equipment activates/deactivates uplink transmit diversity of the user equipment according to relevant reference measurement value(s) of the user equipment. In addition, the user equipment is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Figure 7:
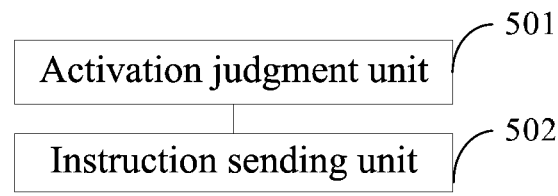
FIG. 7 is a schematic composition diagram of a base station according to an embodiment of the present invention.

Corresponding to the methods described in the above, an embodiment of the present invention further provides a base station, as shown in FIG. 7, including: an activation judgment unit 501 and an instruction sending unit 502.

The activation judgment unit 501 is configured to determine, according to relevant reference measurement value(s) of a user equipment, to activate or deactivate uplink transmit diversity of the user equipment.

The instruction sending unit 502 is configured to send an activation request instruction to a radio network controller when the activation judgment unit 501 determines to activate the uplink transmit diversity of the user equipment, so that the radio network controller notifies, according to the activation request instruction, the user equipment of activating the uplink transmit diversity; or send a deactivation request instruction to a radio network controller when the activation judgment unit 501 determines to deactivate the uplink transmit diversity of the user equipment, so that the radio network controller notifies, according to the deactivation request instruction, the user equipment of deactivating the uplink transmit diversity.

In another embodiment of the present invention, the base station further specifically includes: a reference value receiving unit, configured to receive relevant reference measurement value(s) of the user equipment which is sent from the user equipment, where the relevant reference measurement value(s) of the user equipment includes a power and channel quality of the user equipment.

In another embodiment of the present invention, the base station further specifically includes: a reference value detection unit, configured to detect relevant reference measurement value(s) of the base station for determining to activate or deactivate the uplink transmit diversity of the user equipment, where the relevant reference measurement value(s) of the base station includes an internal resource use condition of the base station.

The activation judgment unit 501 is specifically configured to determine, according to the relevant reference measurement value(s) received by the reference value receiving unit and the relevant reference measurement value(s) detected by the reference value detection unit, to activate or deactivate the uplink transmit diversity of the user equipment.

In another embodiment of the present invention, the activation judgment unit 501 is specifically configured to: when it is determined, according to the relevant reference measurement value(s) received by the reference value receiving unit and the relevant reference measurement value(s) detected by the reference value detection unit, that the user equipment is in asynchronous state, determine to deactivate the uplink transmit diversity of the user equipment.

In another embodiment of the present invention, the activation judgment unit 501 is specifically configured to: when it is determined, according to the relevant reference measurement value(s) received by the reference value receiving unit and the relevant reference measurement value(s) detected by the reference value detection unit, that a power of the user equipment is limited, determine to deactivate the uplink transmit diversity of the user equipment.

In another embodiment of the present invention, the activation judgment unit 501 is specifically configured to: when it is determined, according to the relevant reference measurement value(s) received by the reference value receiving unit and the relevant reference measurement value(s) detected by the reference value detection unit, that performance of a receiver of the base station is lower than a stipulated threshold, determine to deactivate the uplink transmit diversity of the user equipment; or when it is determined, according to the relevant reference measurement value(s) received by the reference value receiving unit and the relevant reference measurement value(s) detected by the reference value detection unit, that channel quality is lower than a stipulated threshold, determine to deactivate the uplink transmit diversity of the user equipment.

In another embodiment of the present invention, the base station further includes: a response receiving unit, configured to receive an activation acknowledgment response, which is sent from the radio network controller when notifying the user equipment of activating the uplink transmit diversity; or receive a deactivation acknowledgment response, which is sent from the radio network controller when notifying the user equipment of deactivating the uplink transmit diversity.

In another embodiment of the present invention, the base station further includes: a notification receiving unit, configured to: when the user equipment activates the uplink transmit diversity and sends a notification of completing the activation of the uplink transmit diversity to the radio network controller through an air interface message, receive an activation completion notification sent from the radio network controller; or when the user equipment deactivates the uplink transmit diversity and sends a notification of completing the deactivation of the uplink transmit diversity to the radio network controller through an air interface message, receive a deactivation completion notification sent from the radio network controller.

In another embodiment of the present invention, the base station further includes: a notification receiving unit, configured to receive a notification of completing the activation of the uplink transmit diversity, which is sent from the user equipment; or receive a notification of completing the deactivation of the uplink transmit diversity, which is sent from the user equipment.

For a specific working method of the base station described in the embodiment of the present invention, reference may be made to the methods described in FIG. 3 to FIG. 5. Details are not repeated herein.

The base station provided in this embodiment determines, according to relevant reference measurement value(s) of a user equipment, to activate/deactivate uplink transmit diversity of the user equipment, and instructs a radio network controller to notify the user equipment of activating/deactivating the uplink transmit diversity. In addition, the base station is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Figure 8:
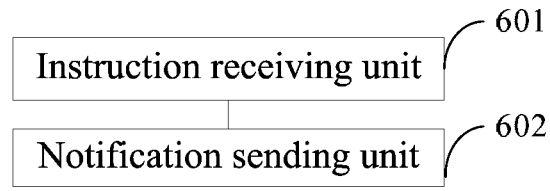
FIG. 8 is a schematic composition diagram of a radio network controller according to an embodiment of the present invention.

Corresponding to the base station described in the above, an embodiment of the present invention further provides a radio network controller, as shown in FIG. 8, including: an instruction receiving unit 601 and a notification sending unit 602.

The instruction receiving unit 601 is configured to receive an activation request instruction of activating a user equipment, which is sent from a base station when determining, according to relevant reference measurement value(s) of the user equipment, to activate uplink transmit diversity of the user equipment, or receive a deactivation request instruction of deactivating a user equipment, which is sent from a base station when determining, according to relevant reference measurement value(s) of the user equipment, to deactivate uplink transmit diversity of the user equipment.

The notification sending unit 602 is configured to send, according to the activation request instruction, a notification of activating the uplink transmit diversity to the user equipment, or send, according to the deactivation request instruction, a notification of deactivating the uplink transmit diversity to the user equipment.

In another embodiment of the present invention, the instruction receiving unit 601 is specifically configured to receive an activation request instruction, which is sent from a base station when determining, according to relevant reference measurement value(s) of a user equipment and relevant reference measurement value(s) of the base station, to activate uplink transmit diversity of the user equipment; or receive a deactivation request instruction, which is sent from a base station when determining, according to relevant reference measurement value(s) of a user equipment and relevant reference measurement value(s) of the base station, to deactivate uplink transmit diversity of the user equipment.

In another embodiment of the present invention, the radio network controller further includes: a response sending unit, configured to send an activation acknowledgment response to the base station when sending a notification of activating the uplink transmit diversity to the user equipment; or send a deactivation acknowledgment response to the base station when sending a notification of deactivating the uplink transmit diversity to the user equipment.

In another embodiment of the present invention, the radio network controller further includes: a completion notification receiving unit and a completion notification sending unit.

The completion notification receiving unit is configured to receive a notification of completing the activation of the uplink transmit diversity, which is sent from the user equipment through an air interface message after the uplink transmit diversity is activated, or a notification of completing the deactivation of the uplink transmit diversity, where the notification is sent from the user equipment using an air interface message after the uplink transmit diversity is deactivated.

The completion notification sending unit is configured to: after the notification of completing the activation of the uplink transmit diversity is received, which is sent from user equipment, send an activation completion notification to the base station; or after the notification of completing the deactivation of the uplink transmit diversity is received, which is sent from user equipment, send a deactivation completion notification to the base station.

The radio network controller provided in this embodiment receives an activation request instruction/deactivation request instruction of activating/deactivating uplink transmit diversity of a user equipment which is sent from a base station according to relevant reference measurement value(s) of the user equipment, and notifies, according to the activation request instruction/deactivation request instruction, the user equipment of activating/deactivating the uplink transmit diversity. In addition, the base station is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Figure 9:
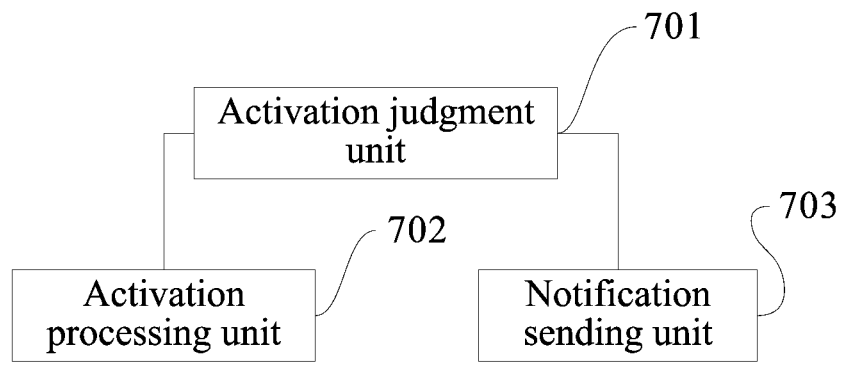
FIG. 9 is a schematic composition diagram of a user equipment according to an embodiment of the present invention.

Corresponding to the methods described in the above, an embodiment of the present invention further provides a user equipment, as shown in FIG. 9, including: an activation judgment unit 701, an activation processing unit 702, and a notification sending unit 703.

The activation judgment unit 701 is configured to determine, according to relevant reference measurement value(s) of the user equipment, to activate or deactivate uplink transmit diversity.

The activation processing unit 702 is configured to activate the uplink transmit diversity when the activation judgment unit 701 determines to activate the uplink transmit diversity; and deactivate the uplink transmit diversity when the activation judgment unit 701 determines to deactivate the uplink transmit diversity of the user equipment.

The notification sending unit 703 is configured to send a notification of activating the uplink transmit diversity of the user equipment to a base station when the activation judgment unit 701 determines to activate the uplink transmit diversity, or send a notification of deactivating the uplink transmit diversity of the user equipment to a base station when the activation judgment unit 701 determines to deactivate the uplink transmit diversity.

In another embodiment of the present invention, the user equipment further includes: a reference value detection unit, configured to detect the relevant reference measurement value(s) of the user equipment itself, where the relevant reference measurement value(s) of the user equipment includes a power and channel quality of the user equipment.

In another embodiment of the present invention, the user equipment further includes: a reference value receiving unit, configured to receive relevant reference measurement value(s) of the base station which is sent from the base station, where the relevant reference measurement value(s) of the base station includes an internal resource use condition of the base station.

The activation judgment unit 701 is configured to determine, according to the relevant reference measurement value(s) received by the reference value receiving unit and the relevant reference measurement value(s) detected by the reference value detection unit, to activate or deactivate the uplink transmit diversity.

In another embodiment of the present invention, the activation judgment unit 701 is specifically configured to: when it is determined, according to the relevant reference measurement value(s) received by the reference value receiving unit and the relevant reference measurement value(s) detected by the reference value detection unit, that the user equipment is in CELL_DCH state, determine to activate the uplink transmit diversity.

In another embodiment of the present invention, the activation judgment unit 701 is specifically configured to: when it is determined, according to the relevant reference measurement value(s) received by the reference value receiving unit and the relevant reference measurement value(s) detected by the reference value detection unit, that the base station has activated continuous packet connectivity, determine to activate the uplink transmit diversity of the user equipment.

For a specific working method of the user equipment described in the embodiment of the present invention, reference may be made to the method described in FIG. 6. Details are not repeated herein.

The user equipment provided in this embodiment activates/deactivates uplink transmit diversity of the user equipment according to relevant reference measurement value(s) of the user equipment. In addition, the user equipment is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Corresponding to the user equipment described in the above, an embodiment of the present invention further provides a base station, including: a notification receiving unit, configured to receive a notification of activating uplink transmit diversity of a user equipment, which is sent from the user equipment when determining, according to relevant reference measurement value(s) of the user equipment, to activate the uplink transmit diversity; or receive a notification of deactivating uplink transmit diversity of a user equipment, which is sent from the user equipment when determining, according to relevant reference measurement value(s) of the user equipment, to deactivate the uplink transmit diversity.

In another embodiment of the present invention, the notification receiving unit is specifically configured to receive a notification of activating the uplink transmit diversity of the user equipment, which is sent from the user equipment when determining, according to the relevant reference measurement value(s) of the user equipment and the relevant reference measurement value(s) of the base station, to activate the uplink transmit diversity; or receive a notification of deactivating the uplink transmit diversity of the user equipment, which is sent from the user equipment when determining, according to the relevant reference measurement value(s) of the user equipment and the relevant reference measurement value(s) of the base station, to deactivate the uplink transmit diversity.

The base station provided in this embodiment receives an activation/deactivation completion notification, which is sent from a user equipment after activating/deactivating uplink transmit diversity of the user equipment according to relevant reference measurement value(s) of the user equipment. In addition, the user equipment is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

Figure 10:
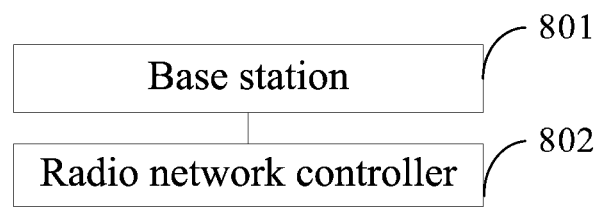
FIG. 10 is a schematic composition diagram of a transmission system based on uplink transmit diversity according to an embodiment of the present invention.

Corresponding to the methods described in the above, an embodiment of the present invention further provides a transmission system based on uplink transmit diversity, as shown in FIG. 10, including a base station 801 and a radio network controller 802.

The base station 801 is configured to send an activation request instruction to the radio network controller 802 when determining, according to relevant reference measurement value(s) of a user equipment, to activate uplink transmit diversity of the user equipment; or send a deactivation request instruction to the radio network controller 802 when determining, according to relevant reference measurement value(s) of a user equipment, to deactivate uplink transmit diversity of the user equipment.

The radio network controller 802 is configured to receive the activation request instruction sent from the base station 801, and notify, according to the activation request instruction, the user equipment of activating the uplink transmit diversity; or receive the deactivation request instruction sent from the base station 801, and notify, according to the deactivation request instruction, the user equipment of deactivating the uplink transmit diversity.

According to the transmission system based on uplink transmit diversity provided in this embodiment, a base station determines, according to relevant reference measurement value(s) of a user equipment, to activate/deactivate uplink transmit diversity of the user equipment, and instructs a radio network controller to notify the user equipment of activating/deactivating the uplink transmit diversity. In addition, the base station is capable of more timely and efficiently learning the relevant reference measurement value(s) of the user equipment, so that determining to activate or deactivate the uplink transmit diversity can be more timely and efficiently performed. In this way, an uplink transmission manner that is suitable for a current transmission condition can be timely and efficiently adjusted, thereby improving uplink transmission quality.

It may be clearly understood by persons skilled in the art that, for the purpose of convenient and brief description, for a detailed working process of the preceding system, apparatus, and unit, reference may be made to the corresponding process in the preceding method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may have other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, that is, may be located in one position, or may be distributed on multiple network units. A part or all of the units may be selected as required to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated units are implemented in the form of a software functional unit and sold or used as an independent product, and may be stored in a computer-readable storage medium. Based on such understanding, the technical solutions of the present invention essentially, or the part contributing to the prior art, or all or a part of the technical solutions may be implemented in the form of a software product. The computer software product is stored in a storage medium and includes several instructions for instructing a computer device (may be a personal computer, a server, a network device, and the like) to perform all or a part of steps of the methods described in the embodiments of the present invention. The preceding storage medium includes: any medium that can store a program code, such as a USB flash disk, a removable hard disk, a read-only memory (Read-Only Memory, ROM), a random access memory (Random Access Memory, RAM), a magnetic disk, or an optical disk.

It should be noted that the preceding embodiments are merely intended for describing the technical solutions of the present invention other than limiting the present invention. Although the present invention is described in detail with reference to the preceding embodiments, persons of ordinary skill in the art should understand that they may still make modifications to the technical solutions described in the embodiments, or make equivalent replacements to some technical features in the technical solutions thereof, and these modifications or replacements should not make corresponding technical solutions depart from scope of the technical solutions of the embodiments of the present invention.

What is claimed is:

1. A transmission method based on uplink transmit diversity, comprising one of the following steps:
   sending, by a base station, an activation request instruction to a radio network controller if determining to activate the uplink transmit diversity of a user equipment, so that the radio network controller notifies, according to the activation request instruction, the user equipment of activating the uplink transmit diversity; and
   sending, by the base station, a deactivation request instruction to the radio network controller if determining to deactivate the uplink transmit diversity of the user equipment, so that the radio network controller notifies, according to the deactivation request instruction, the user equipment of deactivating the uplink transmit diversity.

2. The method according to claim 1, further comprising:
   acquiring, by the base station, at least one relevant reference measurement value of the user equipment; and
   determining, by the base station, according to the at least one relevant reference measurement value of the user equipment, to activate the uplink transmit diversity of the user equipment.

3. The method according to claim 1, further comprising:
   acquiring, by the base station, at least one relevant reference measurement value of the user equipment and at least one relevant reference measurement value of the base station; and
   determining, by the base station, according to the at least one relevant reference measurement value of the user equipment and at least one the relevant reference measurement value of the base station, to activate the uplink transmit diversity of the user equipment.

4. The method according to claim 1, further comprising:
   acquiring, by the base station, at least one relevant reference measurement value of the user equipment and at least one relevant reference measurement value of the base station; and
   determining, by the base station, according to the at least one relevant reference measurement value of the user equipment and the at least one relevant reference measurement value of the base station, to deactivate the uplink transmit diversity of the user equipment.

5. The method according to claim 4, further comprising any one of the following steps:
- determining, by the base station, to deactivate the uplink transmit diversity of the user equipment, if determining, according to the at least one relevant reference measurement value of the user equipment and the at least one relevant reference measurement value of the base station, that the user equipment is in an asynchronous state;
- determining, by the base station, to deactivate the uplink transmit diversity of the user equipment, if determining, according to the at least one relevant reference measurement value of the user equipment and the at least one relevant reference measurement value of the base station, that a power of the user equipment is limited;
- determining, by the base station, to deactivate the uplink transmit diversity of the user equipment, if determining, according to the at least one relevant reference measurement value of the user equipment and the at least one relevant reference measurement value of the base station, that performance of a receiver of the base station is lower than a stipulated threshold; and
- determining, by the base station, to deactivate the uplink transmit diversity of the user equipment, if determining, according to the at least one relevant reference measurement value of the user equipment and the at least one relevant reference measurement value of the base station, that channel quality is lower than a stipulated threshold.

6. The method according to claim 1, further comprising one of the following steps:
- receiving, by the base station, an activation acknowledgment response sent from the radio network controller, if the radio network controller notifies, according to the activation request instruction, the user equipment of activating the uplink transmit diversity; and
- receiving, by the base station, a deactivation acknowledgment response sent from the radio network controller, if the radio network controller notifies, according to the deactivation request instruction, the user equipment of deactivating the uplink transmit diversity.

7. The method according to claim 1, further comprising one of the following steps:
- receiving, by the base station, an activation completion notification sent from the radio network controller, of the user equipment activates the uplink transmit diversity and sends a notification of completing the activation of the uplink transmit diversity to the radio network controller through an air interface message; and
- receiving, by the base station, a deactivation completion notification sent from the radio network controller, if the user equipment deactivates the uplink transmit diversity and sends a notification of completing the deactivation of the uplink transmit diversity to the radio network controller through an air interface message.

8. The method according to claim 1, further comprising one of the following steps:
- receiving, by the base station, a notification of completing the activation of the uplink transmit diversity, which is sent from the user equipment; and
- receiving, by the base station, a notification of completing the deactivation of the uplink transmit diversity, which is sent from the user equipment.

9. A transmission method based on uplink transmit diversity, comprising one of the following steps:
- receiving an activation request instruction at a radio network controller, which is sent from a base station, if determining to activate the uplink transmit diversity of a user equipment; and notifying, according to the activation request instruction, the user equipment of activating the uplink transmit diversity; and
- receiving a deactivation request instruction at the radio network controller, which is sent from the base station, if determining to deactivate the uplink transmit diversity of the user equipment; and notifying, according to the deactivation request instruction, the user equipment of deactivating the uplink transmit diversity.

10. The method according to claim 9, wherein the receiving the activation request instruction comprises:
- receiving, by the radio network controller, the activation request instruction, which is sent from the base station, if determining, according to at least one relevant reference measurement value of the user equipment and at least one relevant reference measurement value of the base station, to activate the uplink transmit diversity of the user equipment; or
- wherein the receiving the deactivation request instruction, which is sent from the base station if determining to deactivate the uplink transmit diversity of the user equipment comprises:
- receiving, by a radio network controller, the deactivation request instruction, which is sent from the base station if determining, according to at least one relevant reference measurement value of the user equipment and at least one relevant reference measurement value of the base station, to deactivate the uplink transmit diversity of the user equipment.

11. The method according to claim 10, wherein the receiving, by the base station controller, the deactivation request instruction, which is sent from the base station if determining, according to the at least one relevant reference measurement value of the user equipment and the at least one relevant reference measurement value of the base station, to deactivate the uplink transmit diversity of the user equipment comprises any one of the following steps:
- receiving, by the base station controller, the deactivation request instruction, which is sent from the base station, if determining, according to the at least one relevant reference measurement value of the user equipment and the at least one relevant reference measurement value of the base station, that the user equipment is in an asynchronous state and to deactivate the uplink transmit diversity of the user equipment;
- receiving, by the base station controller, the deactivation request instruction, which is sent from the base station, if determining, according to the at least one relevant reference measurement value of the user equipment and the at least one relevant reference measurement value of the base station, that a power of the user equipment is limited and to deactivate the uplink transmit diversity of the user equipment;
- receiving, by the base station controller, the deactivation request instruction, which is sent from the base station, if determining, according to the at least one relevant reference measurement value of the user equipment and the at least one relevant reference measurement value of the base station, that performance of a receiver of the base station is lower than a stipulated threshold and to deactivate the uplink transmit diversity of the user equipment; and
- receiving, by the base station controller, the deactivation request instruction, which is sent from the base station, if determining, according to the at least one relevant reference measurement value of the user equipment and the at least one relevant reference measurement value of the base station, that channel quality is lower than a stipulated threshold and to deactivate the uplink transmit diversity of the user equipment.

12. The method according to claim 9, wherein the notifying, according to the activation request instruction, the user equipment of activating the uplink transmit diversity comprises:
notifying, by a radio network controller, according to the activation request instruction, the user equipment of activating the uplink transmit diversity, and sending an activation acknowledgment response to the base station;
or
wherein the notifying, according to the deactivation request instruction, the user equipment of deactivating the uplink transmit diversity comprises:
notifying, by a radio network controller, according to the deactivation request instruction, the user equipment of deactivating the uplink transmit diversity, and sending a deactivation acknowledgment response to the base station.

13. The method according to claim 9, further comprising one of the following steps:
receiving, by a radio network controller, a notification of completing the activation of the uplink transmit diversity, which is sent from the user equipment through an air interface message after the uplink transmit diversity is activated, and sending an activation completion notification to the base station; and
receiving, by the radio network controller, the notification of completing the deactivation of the uplink transmit diversity, which is sent from the user equipment through the air interface message after the uplink transmit diversity is deactivated, and sending a deactivation completion notification to the base station.

14. A base station, comprising:
a processor, configured to determine to activate or deactivate uplink transmit diversity of a user equipment; and
a transmitter, configured to send an activation request instruction to a radio network controller, if the processor determines to activate the uplink transmit diversity of the user equipment, so that the radio network controller notifies, according to the activation request instruction, the user equipment of activating the uplink transmit diversity; or send a deactivation request instruction to the radio network controller, if the processor determines to deactivate the uplink transmit diversity of the user equipment, so that the radio network controller notifies, according to the deactivation request instruction, the user equipment of deactivating the uplink transmit diversity.

15. The base station according to claim 14, further comprising:
a receiver, configured to receive at least one relevant reference measurement value of the user equipment which is sent from the user equipment;
wherein the processor is further configured to determine, according to the at least one relevant reference measurement value of the user equipment, to activate or deactivate the uplink transmit diversity of the user equipment.

16. The base station according to claim 14, further comprising:
a receiver configured to receive at least one relevant reference measurement value of the user equipment which is sent from the user equipment and acquire at least one relevant reference measurement value of the base station which are sent from the user equipment; wherein the processor is further configured to determine, according to the at least one relevant reference measurement value of the user equipment and the at least one relevant reference measurement value of the base station to activate or deactivate the uplink transmit diversity of the user equipment.

17. The base station according to claim 16, wherein the processor is further configured to implement at least one of the following (a), (b), (c) and (d):
(a) determining to deactivate the uplink transmit diversity of the user equipment if determining, according to the at least one relevant reference measurement value of the user equipment and the at least one relevant reference measurement value of the base station, that the user equipment is in an asynchronous state;
(b) determining to deactivate the uplink transmit diversity of the user equipment if determining, according to the at least one relevant reference measurement value of the user equipment and the at least one relevant reference measurement value of the base station, that a power of the user equipment is limited;
(c) determining to deactivate the uplink transmit diversity of the user equipment if determining, according to the at least one relevant reference measurement value of the user equipment and the at least one relevant reference measurement value of the base station, that performance of a receiver of the base station is lower than a stipulated threshold; and
(d) determining to deactivate the uplink transmit diversity of the user equipment if determining, according to the at least one relevant reference measurement value of the user equipment and the at least one relevant reference measurement value of the base station, that channel quality is lower than a stipulated threshold.

18. The base station according to claim 14, further comprising:
a receiver, configured to receive an activation acknowledgment response, which is sent from the radio network controller if notifying the user equipment of activating the uplink transmit diversity; or receive a deactivation acknowledgment response, which is sent from the radio network controller if notifying the user equipment of deactivating the uplink transmit diversity.

19. The base station according to claim 14, further comprising:
a receiver, configured to receive an activation completion notification sent from the radio network controller if the user equipment activates the uplink transmit diversity and sends a notification of completing the activation of the uplink transmit diversity to the radio network controller through an air interface message; or receive a deactivation completion notification sent from the radio network controller if the user equipment deactivates the uplink transmit diversity and sends a notification of completing the deactivation of the uplink transmit diversity to the radio network controller through an air interface message.

20. The base station according to claim 14, further comprising:
a receiver, configured to receive a notification of completing the activation of the uplink transmit diversity, which is sent from the user equipment; or receive a notification of completing the deactivation of the uplink transmit diversity, which is sent from the user equipment.

21. A radio network controller, comprising:
a receiver, configured to receive an activation request instruction of activating a user equipment, which is sent from a base station, if determining to activate uplink transmit diversity of the user equipment, or receive a deactivation request instruction of deactivating the user equipment, which is sent from the base station if determining to deactivate the uplink transmit diversity of the user equipment; and a transmitter, configured to send a notification of activating the uplink transmit diversity to the user equipment according to the activation request instruction; or send a notification of deactivating the uplink transmit diversity to the user equipment according to the deactivation request instruction.

22. The radio network controller according to claim 21, wherein the receiver is configured to receive the activation request instruction, which is sent from the base station if determining, according to at least one relevant reference measurement value of the user equipment and at least one relevant reference measurement value of the base station, to activate the uplink transmit diversity of the user equipment; or receive the deactivation request instruction, which is sent from the base station if determining, according to at least one relevant reference measurement value of the user equipment and at least one relevant reference measurement value of the base station, to deactivate the uplink transmit diversity of the user equipment.

23. The radio network controller according to claim 21, wherein, the transmitter is further configured to send an activation acknowledgment response to the base station if sending the notification of activating the uplink transmit diversity to the user equipment; or send a deactivation acknowledgment response to the base station if sending the notification of deactivating the uplink transmit diversity to the user equipment.

24. The radio network controller according to claim 21, wherein, the receiver is further configured to receive a notification of completing the activation of the uplink transmit diversity or a notification of completing the deactivation of the uplink transmit diversity, which is sent from the user equipment through an air interface message after the uplink transmit diversity is activated; and the transmitter is further configured to: after the notification of completing the activation of the uplink transmit diversity is received, which is sent from the user equipment, send an activation completion notification to the base station; or after the notification of completing the deactivation of the uplink transmit diversity is received, which is sent from the user equipment, send a deactivation completion notification to the base station.

25. A transmission system based on uplink transmit diversity, comprising a base station and a radio network controller; wherein:

the base station is configured to send an activation request instruction to the radio network controller if determining to activate uplink transmit diversity of the user equipment; or send a deactivation request instruction to the radio network controller if determining to deactivate uplink transmit diversity of the user equipment; and the radio network controller is configured to receive the activation request instruction sent from the base station, and notify, according to the activation request instruction, the user equipment of activating the uplink transmit diversity; or receive the deactivation request instruction sent from the base station, and notify, according to the deactivation request instruction, the user equipment of deactivating the uplink transmit diversity.

* * * * *